(12) United States Patent
Lam et al.

(10) Patent No.: US 7,119,732 B1
(45) Date of Patent: Oct. 10, 2006

(54) BISTATIC AND MULTISTATIC SYSTEM FOR SPACE SITUATIONAL AWARENESS

(75) Inventors: Juan F. Lam, Manhattan Beach, CA (US); Theofanis Mavromatis, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/292,014

(22) Filed: Dec. 1, 2005

(51) Int. Cl.
*G01S 13/04* (2006.01)
*G01S 13/06* (2006.01)
*G01S 13/89* (2006.01)
*G01S 13/90* (2006.01)
*G01S 7/40* (2006.01)

(52) U.S. Cl. .................... 342/27; 342/25 R; 342/25 A; 342/25 F; 342/59; 342/73; 342/74; 342/75; 342/78; 342/89; 342/90; 342/118; 342/165; 342/173; 342/174; 342/175; 342/176; 342/179; 342/192; 342/195

(58) Field of Classification Search ............... 89/1.11; 342/25 R–25 F, 27, 28, 42–51, 59, 61–68, 342/89, 90, 118, 125–145, 175–176, 179, 342/192–197, 450–465, 73–81, 165, 173, 342/174, 26 R–26 D; 367/87, 93, 94; 340/540, 340/541, 551–567
See application file for complete search history.

(56) References Cited

U.S. PATENT DOCUMENTS

| | | | | |
|---|---|---|---|---|
| 3,787,843 A | * | 1/1974 | Poirier | 342/27 |
| 3,932,871 A | * | 1/1976 | Foote | 342/28 |
| 5,173,704 A | * | 12/1992 | Buehler et al. | 342/26 D |
| 5,963,130 A | * | 10/1999 | Schlager et al. | 340/540 |
| 6,466,157 B1 | * | 10/2002 | Bjornholt et al. | 342/28 |

FOREIGN PATENT DOCUMENTS

GB    2111679 A    *   7/1983

* cited by examiner

*Primary Examiner*—Bernarr E. Gregory
(74) *Attorney, Agent, or Firm*—Leonard A. Alkov; Karla A. Vick

(57) ABSTRACT

Provided is a bistatic and multistatic system for detecting and identifying a target in close proximity to an orbiting satellite. An electromagnetic fence is established to surround the satellite, using a ground-based communication uplink from a gateway antenna. A contact or breach of the electromagnetic fence by the target is detected by the satellite, or at other sensor locations, and an exact position, range and ISAR image of the target is calculated using scattered RF energy from the fence. Identification data is transmitted to satellite system monitors, whereby the data is used to decide on a corrective course of action.

20 Claims, 5 Drawing Sheets

BISTATIC AND MULTISTATIC SYSTEM FOR SPACE SITUATIONAL AWARENESS

FIELD OF THE INVENTION

This invention relates generally to situational awareness and target or object detection in a space environment. More particularly, this invention relates to a system and method for bi-static and multi-static radar detection of unknown targets/objects.

BACKGROUND

A long standing challenge for governments and the commercial space industry is developing an effective means for detecting when an unknown object or target is approaching a space-borne platform, such as a satellite. Detection and identification of targets may be necessary to protect satellites from damage and/or functional degradation. The need for "space situational awareness" is accented by an ever increasing effort to use satellites and other space-borne platforms for more than just observation and communication purposes.

Satellite operations often include a gateway antenna on Earth which establishes an uplink with one or more satellites orbiting the Earth. The satellite may be in a low Earth orbit (LEO), medium Earth orbit (MEO) of a geo-stationary orbit (GEO). The uplink is via a transmitted radio frequency signal which is typically in one of several frequency bands, to include C, X, Ka, and Ku bands. Once the link is established, complex tracking algorithms and hardware ensure the link is not broken as the satellite orbits. If the satellite becomes damaged, however, the link may be broken despite the best efforts of the antenna and tracking subsystems.

A reliable, cost effective means for detecting and identifying an object approaching a satellite, or other space-borne platform, does not exist in the open literature. Detection alone is an inadequate defense mechanism, as an approaching object may or may not be man-made, and it may or may not pose an ultimate threat to the platform. Identification, while certainly preferred, often requires expensive detectors and processors that may occupy more space, and utilize more power, than is available on the platform.

Hence, there is a need for a system for space situational awareness that detects and identifies a target as it approaches a space-borne platform, thereby giving operators a chance to take corrective and/or defensive measures. The system must be able to operate within existing satellite system architectures and envelopes, and it must provide reliable data that can be used in a decision making process.

SUMMARY

The bistatic and multistatic system for space situational awareness herein disclosed advances the art and overcomes problems articulated above by providing a system for detecting and identifying a target as the target approaches a space-borne platform.

In particular, and by way of example only, according to an embodiment, a method for establishing relative situational awareness between a space-borne platform and a target is provided, including: establishing an electromagnetic fence around the space-borne platform, the fence extending from a radio frequency signal source, said signal extending outwardly in space beyond the space-borne platform; detecting a target contacting the electromagnetic fence; calculating a distance from the target to the space-borne platform; and generating a radio frequency image of the target.

In another embodiment, provided is a system for detecting and identifying a target in proximity to a space-borne platform, including: an electro-magnetic fence positioned around the space-borne platform; a radio frequency signal source for generating the electro-magnetic fence; a detector positioned on the space-borne platform for detecting a contact of the electromagnetic fence by the target; and a processor for processing directed and reflected radio frequency signals to detect and identify the target.

In yet another embodiment, provided is a system for detecting and identifying a target in proximity to a space-borne platform, including: a means for establishing an electro-magnetic fence around the space-borne platform; a means for detecting a contact of the electromagnetic fence by the target; and a means for calculating positional information of the target and for identifying the target.

DETAILED DESCRIPTION

Before proceeding with the detailed description, it should be noted that the present teaching is by way of example, not by limitation. The concepts herein are not limited to use or application with one specific type of space situational awareness system. Thus, although the instrumentalities described herein are for the convenience of explanation, shown and described with respect to exemplary embodiments, the principles herein may be equally applied in other types of space situational awareness systems.

Figure 1:
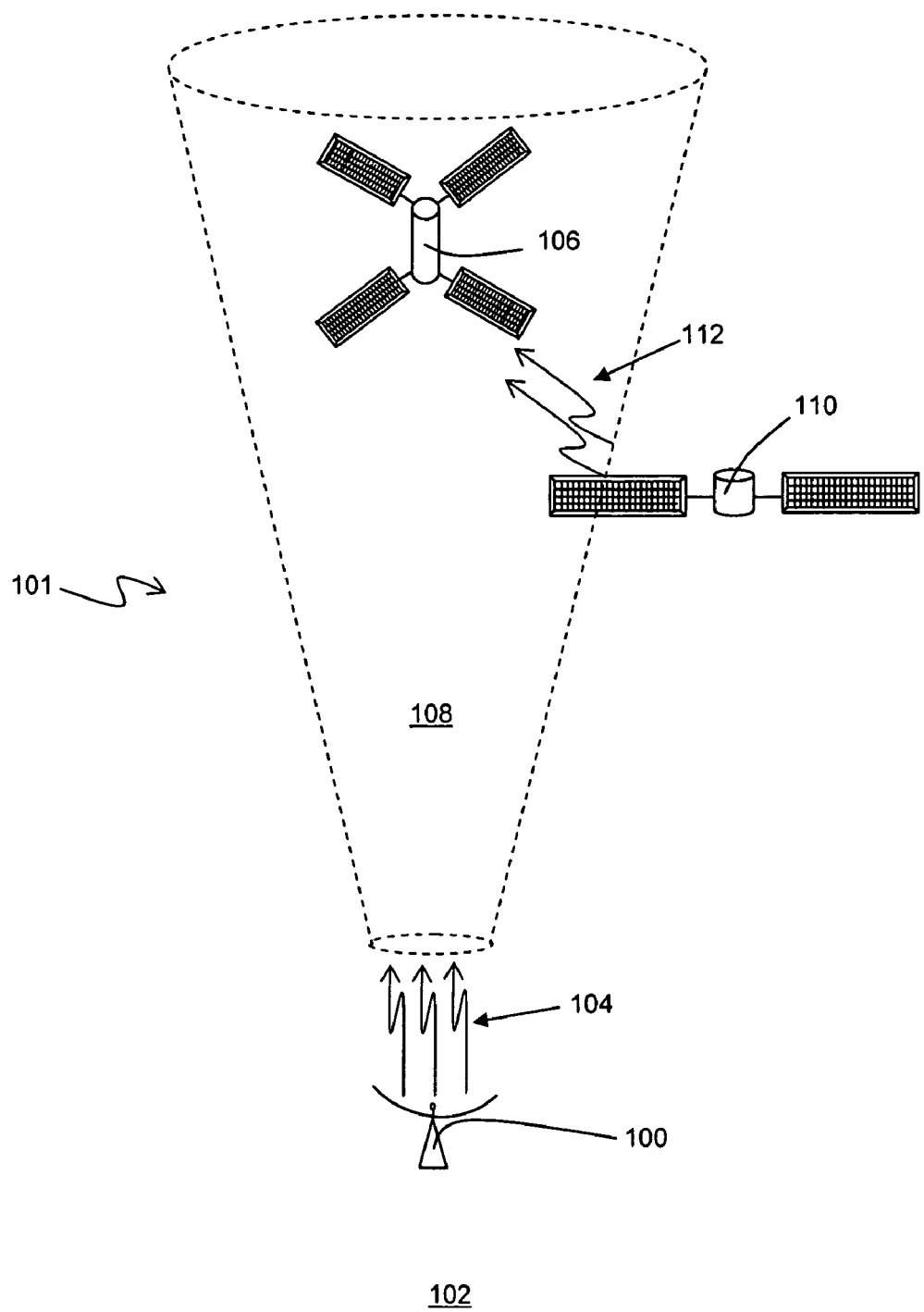
FIG. 1 is a schematic of the operating environment of the present system, according to an embodiment.

FIG. 1 shows an operational environment for the bistatic and multistatic system 101 of the present disclosure. A gateway antenna 100, positioned on Earth 102, transmits an uplink radio frequency (RF) signal 104 to a satellite 106 orbiting Earth 102. The satellite 106 may be orbiting in any one of several orbits to include LEO, MEO and GEO. Further, satellite 106 may be a microsatellite, as that term is commonly used in the space satellite industry. While FIG. 1 depicts one operational environment, it can be appreciated that other environments may be contemplated without exceeding the scope of this application. For example, an alternative source of RF signal 104 may be a second space-borne platform. Likewise, satellite 106 may be any of a number of space-borne platforms, to include manned platforms.

Gateway antenna 100 may be any of a type of antenna well known in the art. Typically, the frequency of signal 104 is in the C, X, Ku or Ka band, however, other frequency bands may be used as well. As shown in FIG. 1, signal 104 forms a conical beam 108 as it propagates toward satellite 106. The base radius of beam 108, and the direction of the beam 108, can be changed automatically by controlling the parabolic antenna that is part of gateway antenna 100. Satellite 106 is positioned within the cone of beam 108, which is to say satellite 106 is surrounded on all or most sides by RF energy transmitted from gateway antenna 100. In this way, conical beam 108 is an electromagnetic fence surrounding satellite 106.

As satellite 106 continues to orbit Earth 102, an unknown object or target 110 may enter the path of satellite 106, or the target 110 may intentionally approach satellite 106 from any angle or orientation. At some point, as target 110 approaches satellite 106, target 110 may contact conical beam or electromagnetic fence 108, thereby scattering some of the RF energy of the fence 108. The degree to which RF energy is scattered is dependent, in part, on the characteristics of target 110, to include angular rotation, size, and speed. Further, the bandwidth of the spectral signal generated when target 110 contacts or breaches fence 108 is dependent on target characteristics as well. Scattered RF energy 112 is detected by a receiver subsystem (not shown) in satellite 106, setting off a chain of events in response to the approach of target 110.

The detection and characterization of target 110 may be referred to as relative situational awareness with respect to satellite 106. System 101, required to detect and identify the target 110, may include in at least one embodiment a source (e.g. antenna 100) of an uplink RF signal 104, an electromagnetic fence 108 resulting from a radio frequency uplink signal 104, and subsystems (not shown) on board the satellite 106 to detect, process and utilize scattered RF energy resulting from the breach of fence 108 by target 110.

Figure 2:
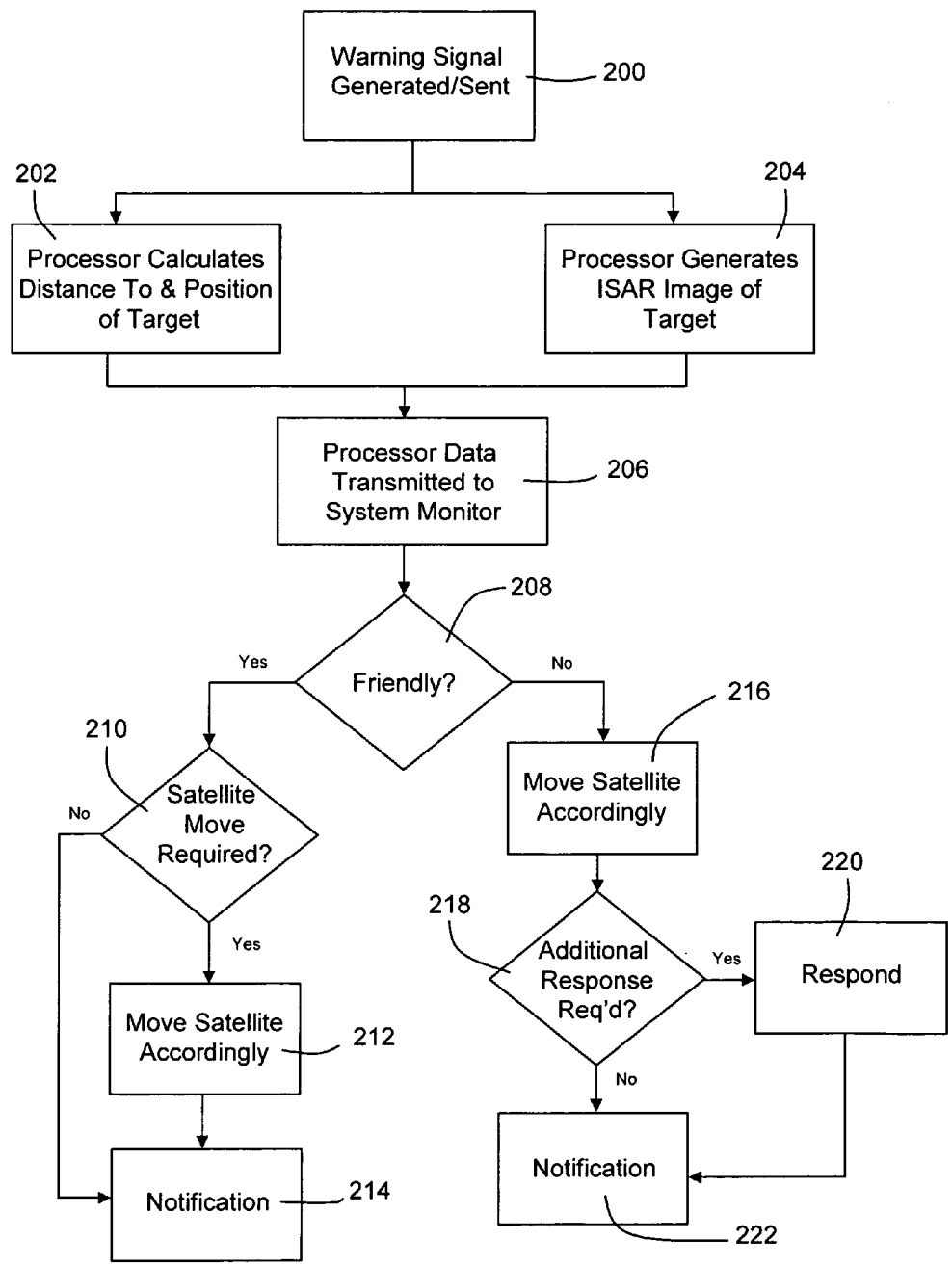
FIG. 2 is a flow chart of response events, according to an embodiment.

Referring for a moment to FIG. 2, a diagram of response events, for at least one embodiment, is presented. As shown, an initial warning signal is generated and sent to a satellite 106 system operator or system monitor, notifying the monitor that a signal has been detected, block 200. Contemporaneously, a processor in satellite 106 uses directed RF energy from antenna 100 and scattered RF energy data to calculate a distance to and a position of target 110, block 202. Also, an inverse synthetic aperture radar (ISAR) image of target 110 is generated (block 204) using angular rotation data derived from the received RF energy 112.

Processed data, which may include both positional data as well as image data, is communicated to the system monitor (block 206) for review. Of note, the system monitor may be a person, or alternatively, the monitor may be an automated system for receiving and analyzing data, and for initiating certain response functions. Once data is transmitted to the system monitor, a series of decision cycles may follow. An initial assessment may be made regarding the status of target 110, i.e. friend or foe, block 208. In this context, "friend" typically refers to a known system that may or may not be in an expected location. The term "foe" may be used to identify any unknown target, to include natural objects, or it may identify known but "unfriendly" targets.

If target 110 is identified as "friend", a decision is made regarding whether satellite 106 must be moved out of its current orbit into an alternate orbit, block 210. If necessary, satellite 106 will be repositioned (block 212) in order to avoid physical contact with target 110. If no movement is required, a notice may be sent to appropriate system monitors and supervisory personnel (block 214), informing each of the approach of target 110 and the actions taken in response.

If target 110 is identified as a "foe", in one embodiment satellite 106 is moved to avoid any possibility of physical contact between the satellite 106 and the target 110, block 216. An additional response may be required (block 218) from satellite 106, and if so that response may be concurrent with movement or completed after satellite 106 has been repositioned, block 220. Once a decision is made regarding an additional response, a notification process begins (block 222) to notify concerned parties and system monitors of the ongoing or recently completed actions.

Figure 3:
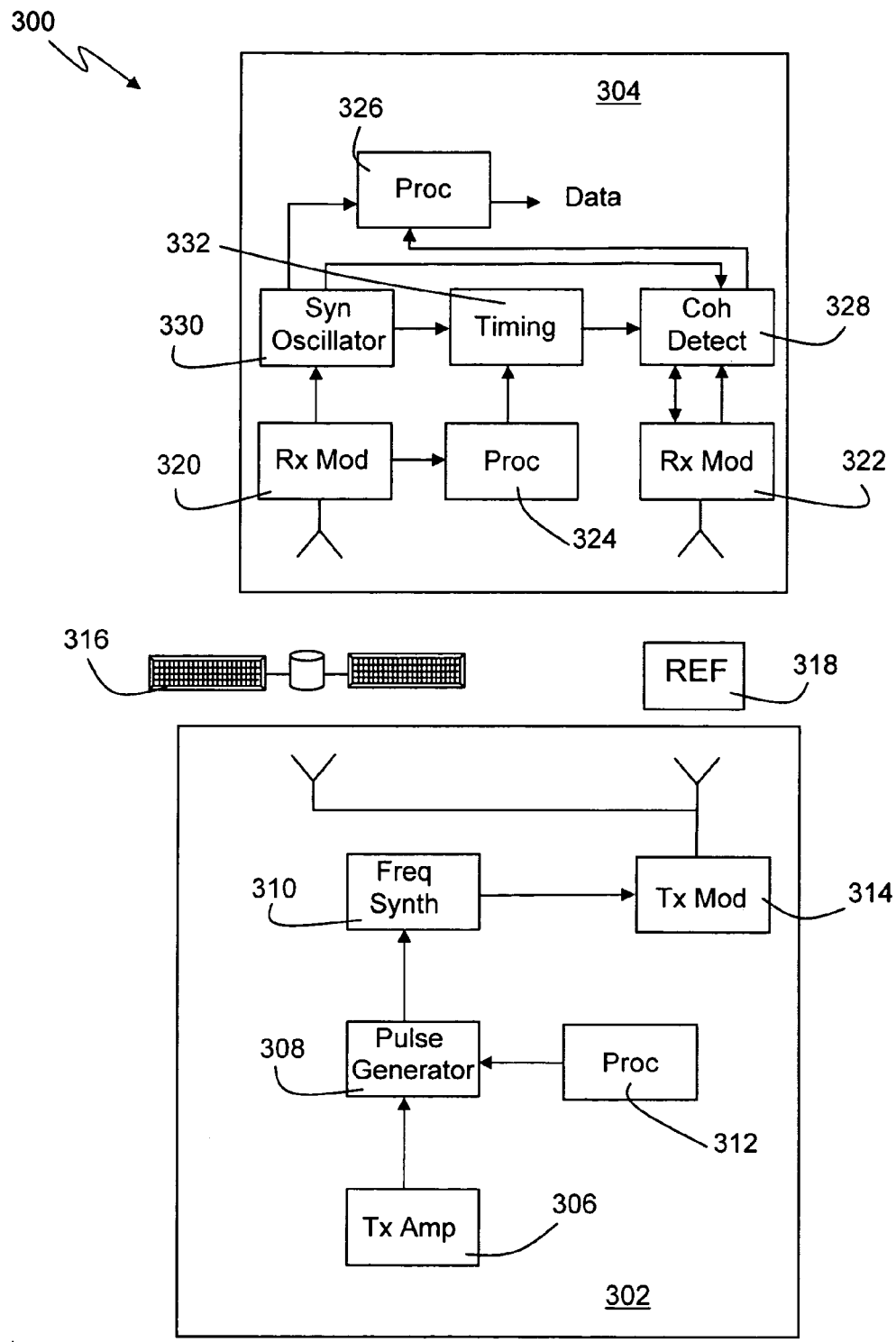
FIG. 3 is a schematic of a bistatic radar detection/range determination system, according to an embodiment.

In at least one embodiment, a sensor subsystem 300 of system 101, such as that depicted in FIG. 3, may be used to transmit and receive RF energy. In FIG. 3, a transmitter subsystem 302 and a receiver subsystem 304 constitute the sensor subsystem 300. The transmitter subsystem 302, which may include a plurality of components such as an amplifier 306, pulse generator 308 and frequency synthesizer 310 is used to generate an RF signal. A processor 312 controls the pulse generation and other functions. The signal is passed to a modulator 314 prior to transmitting the signal toward a target 316 and a known reference 318, which may be satellite 106.

Similarly, in receiver subsystem 304, two RF signals (generally pulsed signals) reflected from the reference 318 and the target 316 respectively are received by one or more detectors or modulators, e.g. modulators 320 and 322. One or more processors 324 and 326 control the processing of the received signals by directing the functions of a coherence detector 328, an oscillator 330 and a timing alignment mechanism 332. A synchronized, aligned signal is transmitted from a processor 326 as coherent RF data. The processed data is then used to verify detection and to identify a target, e.g. target 316.

Considering now a determination of the distance to, and the position of, the target (block 202 FIG. 2), the position of target 110 relative to satellite 106 as depicted in FIG. 1 may be calculated based on the receipt angle of the incoming scattered RF signal 112, taking into account the angular rotation of both target 110 and satellite 106. Satellite 106 may, in at least one embodiment, employ a single receiver subsystem to formulate bistatic measurements. Alternatively, multiple receiver subsystems (multistatic detection) may be used to detect and receive scattered RF energy 112. More important, perhaps, than the orientation or position of target 110, is the distance to target 110, the determination of which will now be discussed.

Figure 4:
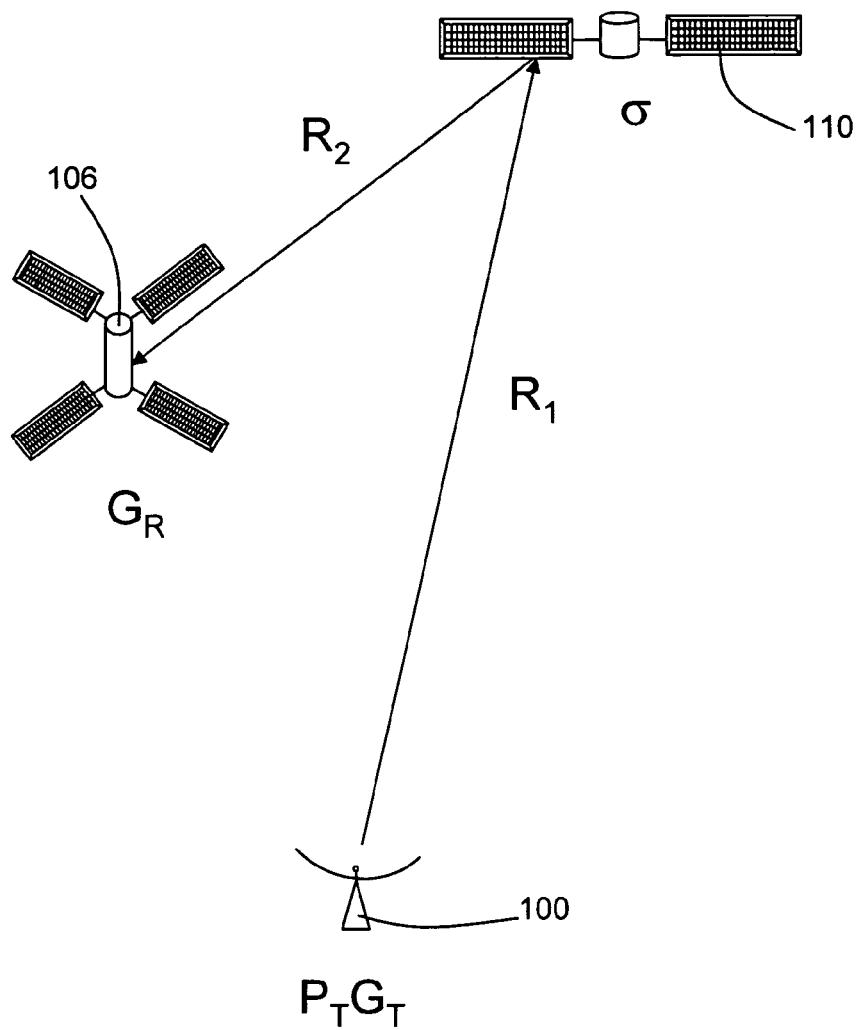
FIG. 4 is a schematic of a sensor system, according to an embodiment.

Referring to FIG. 4, a spatial relationship between gateway antenna 100, satellite 106 and target 110 is presented. As shown, antenna 100 has a known gain ($G_T$) and a known Power ($P_T$). Gateway antenna 100 is considered the transmitting antenna, hence the identifier ("T"). Similarly, a receiving antenna on satellite 106 has a known gain ($G_R$) as well. Target 110, which is at a distance $R_1$ from antenna 100 and $R_2$ from satellite 106, has a radar cross section or RCS ("σ") which may be calculated based on reflected energy returns as it contacts fence 108. The distance $R_1$ may be determined within an acceptable and relatively small margin of error based on the established orbit of satellite 106 (i.e. a LEO, MEO or GEO orbit) because target 110 must be in the same orbit in order to encounter satellite 106.

The ultimate variable of interest is "$R_2$", which is the distance or range from satellite 106 to target 110 at any given moment in time. The unknown "$R_2$" may be calculated using the equation $$R_2 = \frac{1}{R_1}\left[\frac{P_T G_T G_R \lambda^2 \sigma}{(4\pi)^3 kTB(S/N)}\right]^{1/2} \quad (1)$$

The variable "$R_2$" is analogous to the bistatic link budget, and the bistatic radar equations may therefore be used to calculate a signal-to-noise ratio (S/N). In general, S/N is a function of the distances, $R_1$ and $R_2$ (FIG. 3). In a bistatic radar system, S/N is minimized when $R_1=R_2$. It can be appreciated, therefore, that S/N increases as target 110 comes closer to either satellite 110 or antenna 100. By knowing the S/N, the range $R_2$ may be calculated as given in (1) above, wherein $R_1$=distance from transmitter to target
$P_T$=power of the transmitting antenna
$G_T$=gain of the transmitting antenna
$G_R$=gain of the receiving antenna
$\lambda$=wavelength of the transmitted signal
$\sigma$=RCS of the target
k=Boltzman's Constant
T=system temperature
B=receiver bandwidth
and,
S/N=signal-to-noise ratio The processor in satellite 106 may be used to calculate $R_2$, or alternatively data may be sent to a ground station processor for use in calculating the desired target-to-satellite range. Subsequent range calculations can be used to determine if target 110 is moving closer to or further from satellite 106. Further, in at least one embodiment, relative changes in $R_2$ can be used to calculate a closing velocity for target 110. The combination of range and velocity data may also be used to calculate an estimated path of flight for target 110 once target 110 fully breaches fence 108, and is no longer in contact with fence 108.

Figure 5:
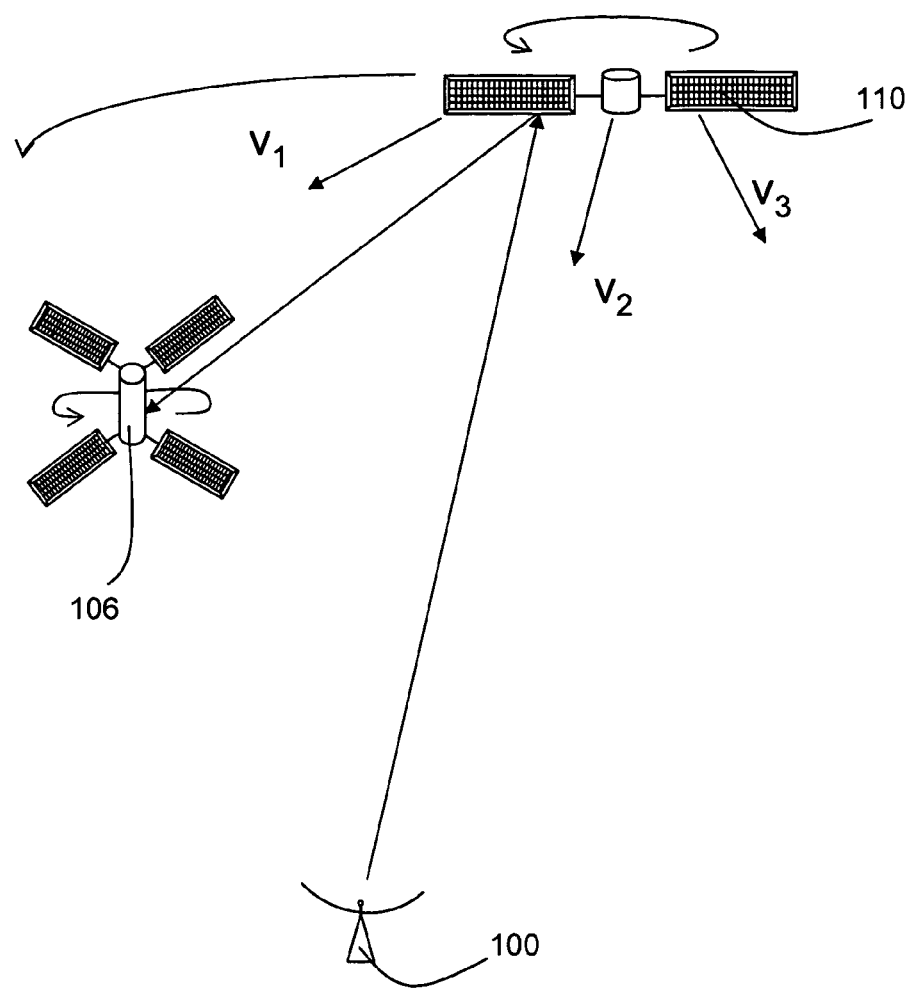
FIG. 5 is a schematic of a Doppler effect for target identification, according to an embodiment.

For a target in motion, i.e. one that is rotating or moving with respect to pitch, yaw and/or roll, different components or facets of the target may have different velocities relative to a stationary antenna that is illuminating the target. For example, three different velocity vectors $V_1$, $V_2$ and $V_3$ are shown in FIG. 5 which represent the relative velocities, with respect to antenna 100, of different facets on target 110, as the target is illuminated by antenna 100. Of note, illumination in this context includes a contact or breach of fence 108 as antenna 100 projects a RF signal toward satellite 106. As a function of the rotation depicted in FIG. 5, slight variations in Doppler frequency are produced, and these frequency variations may be detected by a receiver sensor either on the ground or mounted on satellite 106.

Stated differently, when a rotating target, e.g. target 110, is illuminated, there will be a shift in the Doppler frequencies of reflected energy between any two adjacent point scatterers. These differential Doppler frequencies may be received and processed by a receiver subsystem on satellite 106, or by another sensor suite, and may be used to characterize the reflectivity of target 110 in the Doppler domain. Inverse Synthetic Aperture Radar (ISAR) techniques may use the differential Doppler information to generate a cross-range or azimuth resolution of target 110. In particular, a Fourier transform or other transformation algorithm may be used to process the Doppler data.

Down-range or line-of-sight radar measurements are simply a measure of the distance between an illuminating antenna, e.g. antenna 100, and a target 110, and these measurements may be referred to as conventional radar measurements. Inverse Synthetic Aperture Radar (ISAR) techniques combine the azimuth data derived from differential Doppler frequencies, and the line-of-sight range data derived from a more traditional radar measurement, to generate a two-dimensional ISAR image of target 110.

In an embodiment of the system disclosed herein, one or more receiver subsystems positioned on satellite 106 or elsewhere collect reflectivity data as a rotating target 110 contacts and breaches fence 108. The reflectivity data, indicative of both the Doppler domain and the line-of-sight range distance to target 110, is transmitted to a processor wherein an ISAR image of target 110 is produced. In this way, satellite 106 may detect (at a known range) and identify target 110 as the target contacts the electro-magnetic fence 108 surrounding satellite 106.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A method for establishing relative situational awareness between a space-borne platform and a target, comprising:
   establishing an electromagnetic fence around the space-borne platform, the fence extending from a radio frequency signal source outwardly in space beyond the space-borne platform;
   detecting a target contacting the electromagnetic fence;
   calculating a distance from the target to the space-borne platform; and
   generating a radio frequency image of the target.

2. The method of claim 1, wherein the step of establishing an electromagnetic fence further comprises transmitting uplink RF energy from a ground-based antenna.

3. The method of claim 2, wherein the uplink RF energy forms a conical beam.

4. The method of claim 1, wherein the frequency of the electro-magnetic fence is selected from a group consisting of: C, X, Ku and Ka band.

5. The method of claim 1, wherein the step of detecting a target further comprises using bistatic spectral detection of the target.

6. The method of claim 1, wherein the step of detecting a target further comprises using multistatic spectral detection of the target.

7. The method of claim 1, wherein the step of generating a radio frequency image of the target further comprises creating an inverse synthetic aperture radar image of the target.

8. A system for detecting and identifying a target in proximity to a space-borne platform, comprising:
   an electro-magnetic fence positioned around the space-borne platform;
   a radio frequency signal source for generating the electro-magnetic fence;
   a detector positioned on the space-borne platform for detecting a contact of the electro-magnetic fence by the target; and
   a processor for processing directed and reflected radio frequency signals to detect and identify the target.

9. The system of claim 8, wherein the radio frequency signal source is a ground-based antenna, and further wherein the electromagnetic fence is conical-shaped.

10. The system of claim 8, wherein the frequency of the electro-magnetic fence is selected from the group consisting of: C, X, Ku and Ka band.

11. The system of claim 8, wherein the detection is a bistatic spectral detection.

12. The system of claim 8, wherein the detection is a multistatic spectral detection.

13. The system of claim 8, further comprising an inverse synthetic aperture radar image generated by the processor.

14. A system for detecting and identifying a target in proximity to a space-borne platform, comprising:
- a means for establishing an electromagnetic fence around the space-borne platform;
- a means for detecting a contact of the electromagnetic fence by the target; and
- a means for calculating positional information of the target and for identifying the target.

15. The system of claim 14, wherein the means for establishing an electro-magnetic fence is a ground-based antenna.

16. The system of claim 14, wherein the means for detecting a contact of the electro-magnetic fence is a subsystem selected from the group consisting of: a bi-static sensor subsystem and a multistatic sensor subsystem.

17. The system of claim 14, wherein the means for calculating and for identifying is a processor for generating an inverse synthetic aperture radar image.

18. The system of claim 14, further comprising a warning circuit.

19. The system of claim 14, wherein a frequency of the electromagnetic fence is selected from the group consisting of: C, X, Ku and Ka band.

20. The system of claim 14, wherein positional information includes a position of the target and a range to the target relative to the space-borne platform.

* * * * *